United States Patent [19]

Bradford et al.

[11] Patent Number: 4,486,458

[45] Date of Patent: * Dec. 4, 1984

[54] NON-GELLING CORN STEEP LIQUOR

[75] Inventors: Marion M. Bradford; Frank T. Orthoefer; Kenneth N. Wright, all of Decatur, Ill.

[73] Assignee: A. E. Staley Manufacturing Company, Decatur, Ill.

[*] Notice: The portion of the term of this patent subsequent to Apr. 3, 2001 has been disclaimed.

[21] Appl. No.: 552,633

[22] Filed: Nov. 16, 1983

Related U.S. Application Data

[62] Division of Ser. No. 415,192, Sep. 7, 1982, Pat. No. 4,440,792.

[51] Int. Cl.$^3$ ............... A23K 1/14; A23L 1/10

[52] U.S. Cl. ................... 426/618; 127/33; 426/623

[58] Field of Search ............ 426/271, 330, 623, 635, 426/807, 48, 618; 127/67, 68, 69, 70, 33; 252/1, 175, 180; 210/696, 697, 698

[56] References Cited

U.S. PATENT DOCUMENTS 1,918,812 7/1933 Kerr et al. .
2,298,623 10/1942 Jurgensen et al. .
2,515,157 7/1950 Parsons .
4,163,010 7/1979 Garbutt ........................... 426/490 X Primary Examiner—Arthur L. Corbin
Attorney, Agent, or Firm—Steven R. Lammert; Philip L. Bateman; Forrest L. Collins

[57] ABSTRACT

The presence of a sufficient amount of a calcium complexing agent prevents the gelling of corn steep liquor.

10 Claims, No Drawings

NON-GELLING CORN STEEP LIQUOR

CROSS-REFERENCE TO RELATED APPLICATION

This application is a division of U.S. patent application Ser. No. 06/415,192, filed Sept. 7, 1982, now U.S. Pat. No. 4,440,792.

BACKGROUND OF THE INVENTION

Corn steep liquor is the first by-product of the corn wet-milling process. In that process shelled, air-cleaned corn is soaked or steeped at a temperature of 45°–50° C. for 30 to 48 hours in water initially containing about 0.1 to 0.2% sulfur dioxide. During the steeping or soaking process soluble components of the corn are dissolved in the steeping liquid, and the corn is softened thus facilitating the subsequent grinding process. The steeping liquid, sometimes called light steep water, is separated from the softened corn and concentrated by evaporation to a solids content of about 50%; the resulting concentrate is known in the art as "heavy steep water" or more commonly as "corn steep liquor", sometimes referred to herein as "CSL". Corn steep liquor contains dissolved minerals, carbohydrates, and corn proteins, as well as organic acids (particularly lactic acid) and modified corn proteins (amino acids and polypeptides) which result from the enzymatic activity associated with the one or more natural fermentations which take place during the corn steeping process. The composition of corn steep liquor varies with the type of corn, pH of the steeping liquid (usually 3.8–4.5), the content of the water used in the steeping process (it is often recycled from other steps of the corn-wet-milling process), steeping time and temperature. Depending on the steeping conditions, which can vary greatly from time to time in any given plant, corn steep liquor can have significant variations in relative concentrations of corn extracts and fermentation products of corn extracts. Such compositional variations can have marked effects on the physical characteristics of individual lots of corn steep liquor.

Corn steep liquor finds a wide variety of uses. Primarily it is utilized either alone or in combination with other products or by-products of the corn-wet-milling process as a binder and a valuable nutritive component in animal feeds and as a nutrient medium for commercial fermentations (particularly for antibiotic production).

An industry-wide problem associated with the production and handling of corn steep liquor and liquid CSL-containing compositions is the tendency of some lots of CSL to "liver" or gel in the CSL evaporators as well as in storage, mixing, and transport tanks. When this condition occurs, the CSL or CLS-containing liquid composition is difficult, if not impossible, to pump or otherwise handle. This results in loss of employee time and loss of facilities and equipment use for both the CSL producer and CSL product customers. In instances where the livered CSL has gelled, sometimes to almost a rubber-like consistency, the only practical solution to the problem is the manual/mechanical disposal or removal of the gel.

Several solutions to the "livering" are related "scaling" problems which periodically attend the evaporation of light steep water and the storage and transport of corn steep liquor and liquid CSL-containing compositions have been proposed in the art. U.S. Pat. No. 2,515,157, issued Dec. 8, 1945 describes and claims a treatment of corn steep water with a source of aluminum ions which serves as a precipitant for the naturally occurring phytate in the corn steep water. Precipitation of the phytates as the insoluble aluminum salts in accordance with the described process is said to provide a concentrated liquid nutrient for penicillin-producing molds which does not deposit an objectionable sludge during shipment or storage.

U.S. Pat. No. 1,918,812 likewise acknowleges that "the boiling of the steep water is attended by an objectionable fouling and scaling of the interior of the evaporators. Apparently two kinds of scale are formed. One is called 'rubber' scale and consists largely of protein material, with which other materials in suspension may be aggregated. The other is called 'hard' scale and consists largely of mineral salts. Actually the deposits may be made up of both types of scale in intimate mixture . . . . " That patent discloses that the problem can be overcome by heating the steep water before evaporation to a temperature between 95° F. and 140° F. until the scale forming substances are converted by naturally occurring biochemical activity into non-scale forming substances and thereafter evaporating the steep water.

U.S. Pat. No. 2,298,623 describes a method for reducing scale forming tendencies of concentrated corn steep water which method comprises heating the steep water prior to concentration under pressure to temperatures ranging between 225° F. and 300° F.

SUMMARY OF THE INVENTION

It has been found that the livering or gelling of corn steep liquor (CSL) or liquid CSL-containing compositions can be reversed or prevented by the addition of an effective amount of a calcium (Ca++) complexing agent.

The Ca++ complexing agent can be added to corn steep water before or after its concentration to the solids level characteristic of corn steep liquor. Adjustment of the pH of corn steep liquor to below about 3.8 before, during or subsequent to the addition of the complexing agent is a preferred embodiment of the present invention. When gelled corn steep liquor is treated in accordance with the preferred embodiment of the present invention, its pH can be adjusted back to levels characteristic of untreated corn steep liquor (3.8–4.5) to provide corn steep liquor which has no tendency to gel on standing.

DETAILED DESCRIPTION OF INVENTION

This invention is directed to a method for treating corn steep liquor either to prevent its gelling or "livering" if it has a tendency to do so, or to reverse the gelling, that is, to significantly lower the viscosity or "fluidize" corn steep liquor which has gelled.

The present method is carried out by the addition of an effective amount of a source of a calcium (Ca++) complexing agent to corn steep liquor, or to a liquid composition containing CSL.

The term "calcium complexing agent" as it is used in defining the present invention refers to a source of multivalent anions which can react or complex with or otherwise sequester calcium ions in the corn steep liquor rendering such calcium ions unavailable or less available for interaction with anions or compounds bearing anionic functional groups occurring naturally in the corn steep liquor as a result of the corn steeping procedure and the attendant fermentation processes. Suitable calcium complexing anions are those multivalent anions which combine with calcium ions in the corn steep liquor to form insoluble calcium salts or those anions which form soluble calcium salts or complexes in which the calcium ions are preferentially sequestered vis-a-vis naturally occurring compounds bearing anionic functional groups.

Examples of anions which form substantially insoluble salts with available calcium ions are the phytate, citrate, oxalate, phosphate, metaphosphate, polyphosphate and phosphite anions. Sources of Ca++ complexing anions are the conjugate acids of said anions or any soluble or partially soluble salt of said conjugate acids. The term conjugate acids as used in the art and in the description of the present invention refer to the anions or acids formed by the combination of an anion and one or more hydrogen ions. For example, the conjugate acids of the phosphate anion, $PO_4^{\equiv}$ are $HPO_4^{=}$, $H_2PO_4^{-}$ and $H_3PO_4$.

Exemplary of calcium ion sequestering or complexing agents which do not form insoluble salts but instead preferentially react with or complex calcium ions in solution are ethylenediamine tetra acetic acid (EDTA), ethylene glycol-bis-(beta-aminoethyl ether) N,N'-tetraacetic acid (EGTA), nitrilotriacetic acid (NTA) and salts thereof.

Preferred Ca++ complexing agents for the present process are the conjugate acids of Ca++ complexing anions and the ammonium or alkali metal salts of such conjugate acids. Illustrative of the preferred sources of calcium complexing anions for use in the present process are phytic acid, sodium phytate, citric acid, sodium monobasic citrate, oxalic acid, sodium oxalate, phosphoric acid, potassium monohydrogen phosphate, sodium metaphosphate, sodium dihydrogen phosphate, ammonium dihydrogen phosphate, EDTA, EDTA disodium salt, EGTA, EGTA disodium salt, EGTA dipotassium salt and nitrilotriacetic acid potassium salt. The phosphate anion is a preferred calcium complexing anion for the present process; phosphoric acid is the most preferred source of that complexing anion.

The Ca++ complexing agent can be added to corn steep water before or after its concentration by evaporation to the solids levels characteristic of corn steep liquor, or it can be added to liquid compositions containing corn steep liquor which compositions also may have some tendency to gel. As mentioned hereinabove, corn steep liquor is often combined or blended with other nutrient-containing products or by-products from the corn wet-milling process, for use in animal feed applications and in nutrient media for commercial fermentations. For simplicity in describing the present invention such liquid products containing corn steep liquor are referred to herein as "liquid CSL compositions." The livering or gelling of such liquid CSL compositions can be prevented in accordance with the present process by either treating the corn steep liquor with a source of calcium complexing anion before its blending with other products, or the source of complexing anion can be added directly to the liquid CSL compositions.

The source of Ca++ complexing anions can be added as a salt or acid, or it can be added as a solution of the salt or acid. Since it is desirable to maintain typical solids levels for corn steep liquor, it is preferred that water or other dilutants added in connection with the present method be kept to a minimum. This is true whether the anion source is added before or after the evaporation of the corn steep water in the preparation of corn steep liquor or to liquid CSL compositions.

The amount of complexing agent required to prevent or reverse the gelling of corn steep liquor or liquid CSL compositions depends to some extent on the solids level of the corn steep liquor, the composition of those solids, and concommitantly, the viscosity levels observed for the CSL or liquid CSL composition. Generally about 1% to about 15% by weight (based on weight of corn steep liquor) of the calcium complexing agent is effective to reverse or prevent corn steep liquor gelation. When the process of the present invention is utilized to break the gel (reverse the gelling) and decrease the viscosity of the gelled corn steep liquor, the inventors have found that over that described weight range (1%–15% by weight) of the calcium complexing agent, the decrease in viscosity is often proportionate to the amount of added complexing anion. Generally about 3% to 12% by weight of a Ca++ complexing agent (based on the weight of corn steep liquor) added to the corn steep liquor or to a liquid product containing corn steep liquor effects and maintains workable viscosities in corn steep liquor having a tendency to gel.

As mentioned above, conjugate acids of Ca++ complexing anions are particularly preferred and effective for reducing the viscosity of gelled corn steep liquor as well as preventing gelation of corn steep liquor having some tendency to gel. With the addition of such acids, the pH of the treated corn steep liquor is lowered to below the typical pH levels of about 3.8 to 4.5. The superior effectiveness of the addition of a Ca++ complexing anion conjugate acid to corn steep liquor or liquid CSL compositions in accordance with this invention can be duplicated by adjusting the pH of the corn steep liquor or a liquid CSL composition with, for example, a mineral acid (other than a conjugate acid of a Ca++ complexing anion) to below about 3.8 prior to, during, or after the addition of a non-acid source of complexing anion. For example, a livered CSL sample can be acidified to a pH of about 2.8 with hydrochloric acid and then treated with sodium trimetaphosphate to reduce the viscosity of the CSL to a water-like fluidity. The lowering of the pH of the corn steep liquor appears to enhance the effect of the Ca++ complexing anion in reducing the viscosity of gelled corn steep liquor. Thus, it is preferred in the process of the present invention to lower the pH of the corn steep liquor to a value of about 1.5 to about 3.5 before, during or after the addition of the source of complexing polyvalent anion. Of course, when a conjugate acid of a complexing anion is used as the source of the complexing anion, the pH of the corn steep liquor or liquid CSL composition is lowered directly as a result of the addition of the acid.

Following treatment of corn steep liquor or a liquid CSL composition, in accordance with the present process and typically after agitation for about 1-60 minutes, the pH of the CSL can be adjusted with base to about 3.8-4.5, the pH levels characteristic of corn steep liquor. Adjustment of pH of the de-livered CSL back to the 3.8-4.5 range is accompanied by no significant increase in viscosity.

The following examples are illustrative of the method of the present invention. They are not to be considered as a limitation on the scope of the claimed invention.

EXAMPLE I

To a 50 ml sample of livered corn steep liquor (pH about 4.3) was added with stirring 2 ml of 85% phosphoric acid. Immediately the viscosity of the corn steep liquor was reduced to that of a pourable liquid which did not gel on standing, even after adjustment of the pH of the phosphoric acid-treated corn steep liquor to 4.3 with 50% caustic solution.

EXAMPLE II

Three 50 ml samples of livered corn steep liquor were obtained. To one sample was added approximately 0.5 grams of sodium phytate. To the second was added approximately 0.5 grams of sodium hexametaphosphate. The third 50 ml sample served as the control. Each of the samples were stirred and warmed in a microwave oven for ten seconds to about 50° C. The viscosity of the livered CSL was reduced initially in each case. The viscosity reduction in the sodium hexametaphosphate-treated sample was most pronounced. The samples were then allowed to stand overnight at ambient temperature. The control sample solidified to a nonpourable gel. The samples containing sodium phytate and sodium hexametaphosphate, however, remained pourable.

EXAMPLE III

Two 50 ml portions of livered corn steep liquor were obtained. To one portion was added about 2 grams of sodium monohydrogen phosphate with stirring. To the other was added 2 ml of phosphoric acid with stirring. Dramatic viscosity reduction was noted in each of the samples. The phosphoric acid-treated sample assumed a water-like consistency.

EXAMPLE IV

Individual samples of livered corn steep liquor having a Brookfield viscosity of 35,000 cps at 115° F. were treated with varying amounts of 85% phosphoric acid. The results are presented in Table I. Adjustment of the pH after phosphoric acid addition to about 4.1 with 50% caustic resulted in no significant increase in viscosity.

TABLE I

| Viscosities Obtained on CSL Treated With 85% Phosphoric Acid | | |
|---|---|---|
| % Phosphoric Acid (by wt. based on wt. of CSL) | pH (after acid) | Brookfield Viscosity After acid @ 115° F. |
| 2.66 | 3.86 | 15,600 |
| 5.33 | 3.6 | 9,000 |
| 10.66 | 2.8 | 725 |

We claim:

1. A non-gelling corn steep liquor composition which comprises:
   (a) corn steep liquor; and
   (b) an amount of a calcium complexing agent sufficient to prevent gelling of the corn steep liquor.

2. The composition of claim 1 wherein the calcium complexing agent is an anion selected from the group consisting of phytate anions, citrate anions, oxalate anions, phosphate anions, metaphosphate anions, polyphosphate anions, phosphite anions, and anions derived from EDTA, EGTA, or NTA.

3. The composition of claim 2 wherein the calcium complexing agent is present in an amount of about 1 to 15 weight percent based on the weight of the corn steep liquor.

4. The composition of claim 3 wherein the source of the calcium complexing agent is a conjugate acid of the anion or a salt of the conjugate acid.

5. The composition of claim 4 wherein the source of the calcium complexing agent is an acid or salt selected from the group consisting of phytic acid, sodium phytate, citric acid, sodium monobasic citrate, oxalic acid, sodium oxalate, phosphoric acid, potassium monohydrogen phosphate, sodium metaphosphate, sodium dihydrogen phosphate, ammonium dihydrogen phosphate, EDTA, EDTA disodium salt, EGTA, EGTA disodium salt, EGTA dipotassium salt and nitrilotriacetic acid potassium salt.

6. The composition of claim 5 wherein the pH of the composition is about 3.8 to 4.5

7. The composition of claim 6 wherein the calcium complexing agent is present in an amount of about 3 to 12 weight percent based on the weight of the corn steep liquor.

8. The composition of claim 7 wherein the calcium complexing agent is a phosphate anion.

9. The composition of claim 8 wherein the source of the phosphate anion is phosphoric acid.

10. The composition of claim 8 wherein the source of the phosphate ion is an ammonium or alkali metal mono-, di-, or tribasic phosphate salt.

* * * * *